(12) United States Patent
Cors et al.

(10) Patent No.: US 9,596,138 B2
(45) Date of Patent: *Mar. 14, 2017

(54) SMART DUMPING OF NETWORK SWITCH FORWARDING DATABASE

(71) Applicant: International Business Machines Corporation, Armonk, NY (US)

(72) Inventors: Josep Cors, Rochester, MN (US); Venkatesh K. Janakiraman, Cuertino, CA (US); Joseph A. Kirscht, Rochester, MN (US); David A. Shedivy, Rochester, MN (US); Colin B. Verrilli, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,610

(22) Filed: May 4, 2016

(65) Prior Publication Data

US 2016/0248634 A1     Aug. 25, 2016

Related U.S. Application Data

(63) Continuation of application No. 14/164,655, filed on Jan. 27, 2014, now Pat. No. 9,356,834, which is a continuation of application No. 14/158,196, filed on Jan. 17, 2014, now Pat. No. 9,350,613.

(51) Int. Cl.
    *H04L 12/24*     (2006.01)
(52) U.S. Cl.
    CPC .............................. *H04L 41/0853* (2013.01)
(58) Field of Classification Search
    CPC .................................................. H04L 41/0853
    See application file for complete search history.

(56) References Cited

U.S. PATENT DOCUMENTS

| | | |
|---|---|---|
| 6,996,678 B1 | 2/2006 | Sharma |
| 7,277,399 B1 | 10/2007 | Hughes, Jr. |
| 2015/0207722 A1 | 7/2015 | Cors et al. |
| 2015/0207723 A1 | 7/2015 | Cors et al. |

*Primary Examiner* — Melvin Marcelo
(74) *Attorney, Agent, or Firm* — Patterson + Sheridan, LLP

(57) ABSTRACT

Techniques are provided for retrieving entries from a routing table or a forwarding database in a distributed network switch. The forwarding database includes match and mask registers used to compare routing entries and return matching routing entries to a requesting management controller. The forwarding database uses a separate timeout value associated with the forwarding database to avoid timeout errors for general register operations, and allows for an asynchronous dump operation of routing entries.

16 Claims, 5 Drawing Sheets

SMART DUMPING OF NETWORK SWITCH FORWARDING DATABASE

CROSS-REFERENCE TO RELATED APPLICATIONS

This application is a continuation of co-pending U.S. patent application Ser. No. 14/164,655, filed Jan. 27, 2014, which is a continuation of U.S. patent application Ser. No. 14/158,196, filed Jan. 17, 2014. The aforementioned related patent applications are herein incorporated by reference in their entirety.

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

BRIEF SUMMARY

Embodiments of the present disclosure provide a method, product, and system for performing an operation for retrieving routing entries from a switch module. The method includes receiving, from a management controller, a request for at least one routing entry in a forwarding database (FDB) matching a specified criteria. The request may be associated with a first timeout value. The method further includes initiating a timer associated with the FDB having a value less than the first timeout value. The method includes, responsive to determining a first routing entry in the FDB matches the specified criteria before expiration of the timer associated with the FDB, writing the first routing entry to an output register. The method includes, responsive to expiration of the timer associated with the FDB, writing an indication that an FDB timeout has occurred to the output register. The method further includes asserting a write operation to the output register is completed, and generating a response frame, to the management controller, containing the value of the output register.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

Figure 1:
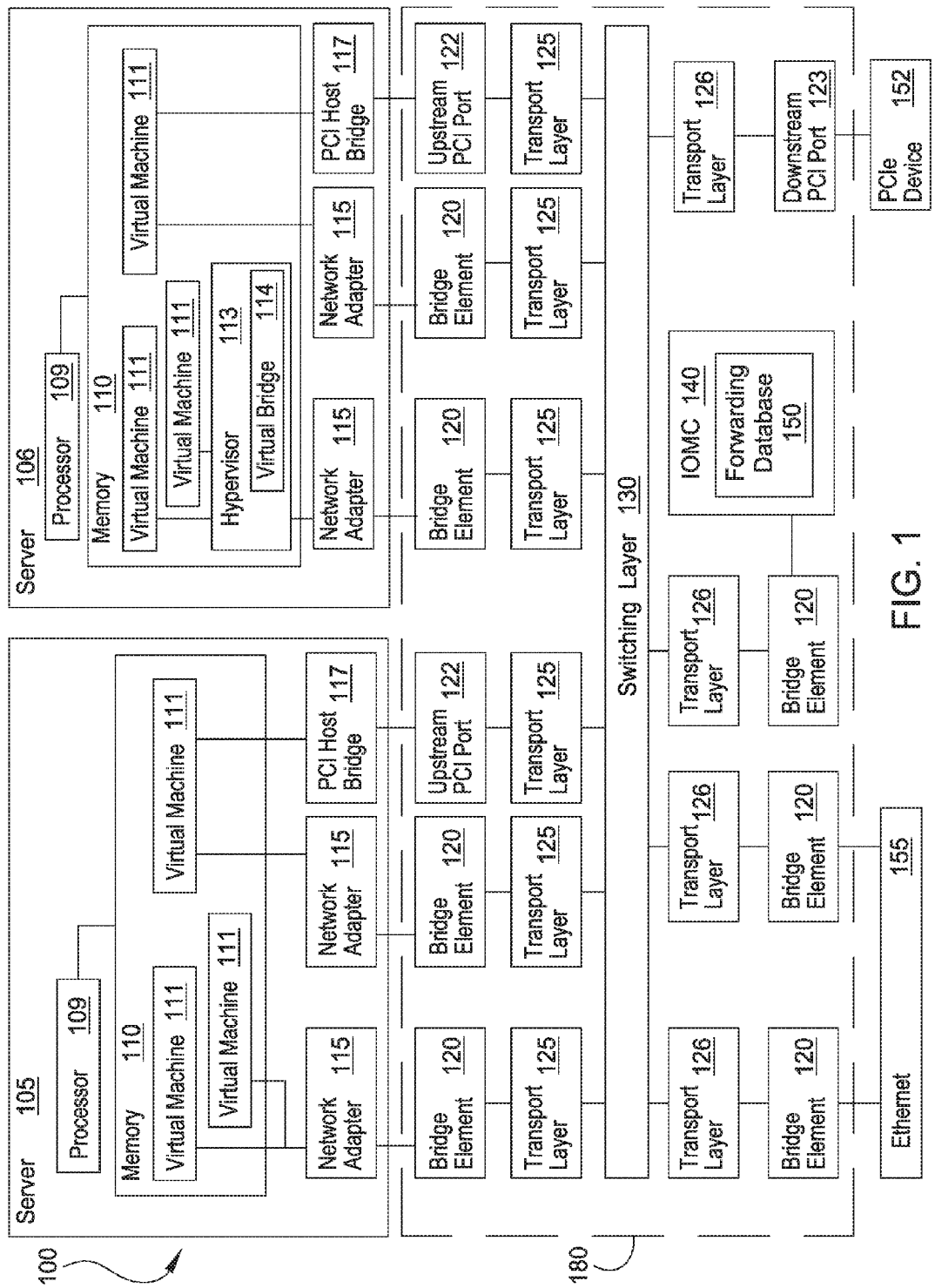
FIG. 1 illustrates a system architecture that includes a distributed network switch, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments of the present disclosure provide techniques for retrieving routing entries from a switch module in a distributed network switch. In one embodiment, the switch module includes hardware components configured to retrieve routing entries from a forwarding database (FDB) that match specified criteria. The retrieved routing entries may be provided to a management controller via a packet-based delivery mechanism that uses Ethernet frames to manipulate registers within the switch module. According to some embodiments, the FDB uses a timeout value separate from the timeout value used for other register operations to timely return results to the management controller.

In the following, reference is made to embodiments of the disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

For example, while the certain aspects of the present disclosure may discuss a forwarding database for finding an outgoing interface to forward a data frame received on an input interface, it should be recognized that the techniques and embodiments described herein may be extended to other packet switching systems, such as routing tables, routing information bases (RIBs), routing databases, etc. As such, the terms "forwarding" and "routing" may be used interchangeably herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system architecture 100 that includes a distributed network switch 180, according to one embodiment of the present disclosure. The computer system 100 includes first and second servers 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115, sometimes referred to as converged network adapters (CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fibre Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks. After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

In one or more embodiments, the distributed network switch 180 includes one or more forwarding databases (FDB) 150, also referred to as a forwarding information base (FIB) or forwarding table, which stores address data. In the embodiment shown, the IOMC 140 includes a global FDB 150 that may be shared by a plurality of bridge elements 120. In one embodiment, the forwarding database 150 may be continuously updated by the bridge elements 120. For example, a bridge element1 may send an update message to the IOMC 140 in response to learning an updated or new MAC address. A corresponding MAC address in the forwarding database 150 may be subsequently updated. Conversely, the address data in the forwarding database 150 may be used to update the bridge elements 120. For example, each bridge element 120 is configured to send a routing information lookup request to the forwarding database 150, and the forwarding database 150 is configured to send a routing information lookup response having address data to the requesting bridge element 120. In one embodiment, each bridge element 120 may cache received address data for future use.

Figure 2:
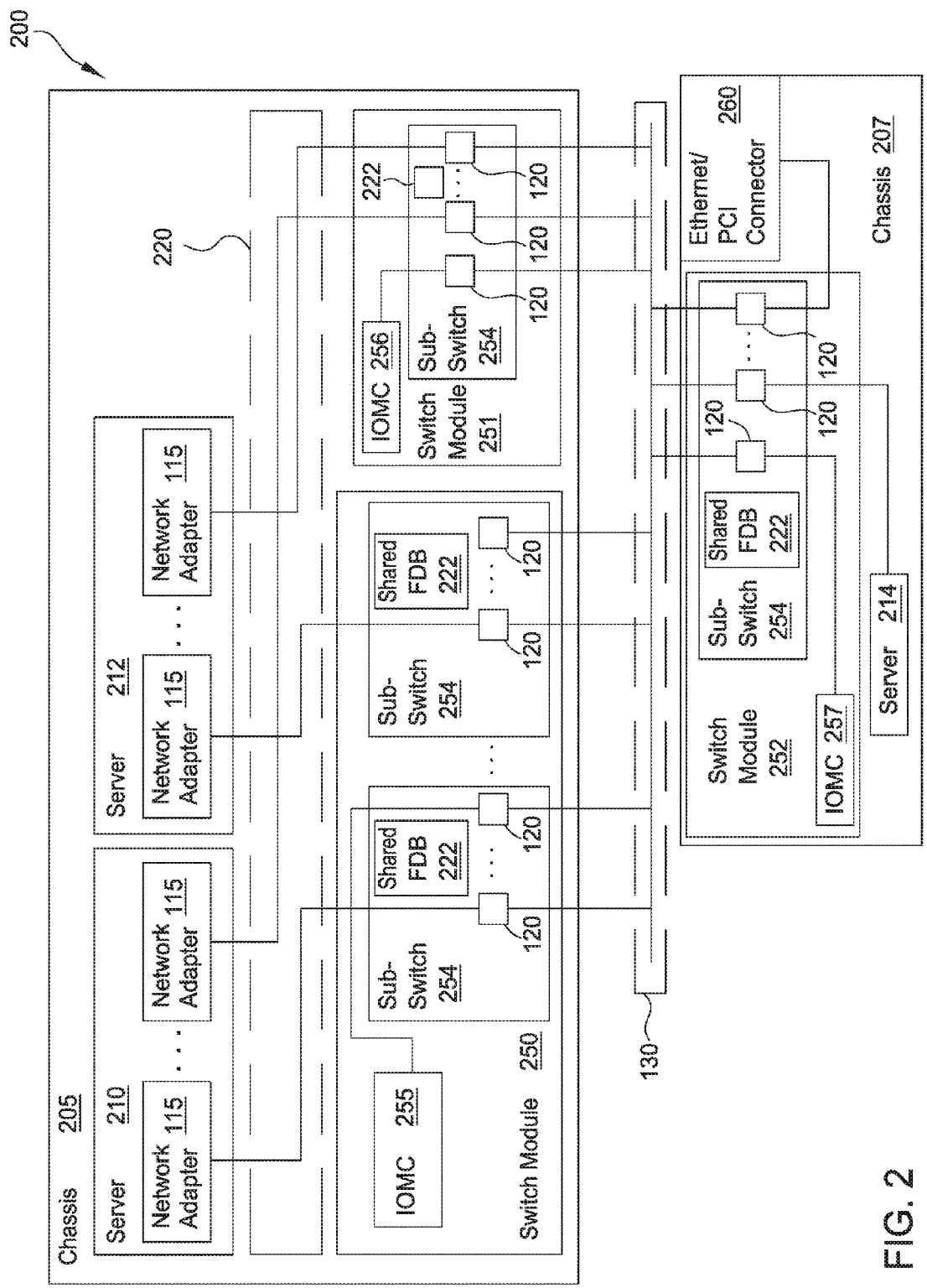
FIG. 2 illustrates a hardware representation of a system that implements a distributed network switch, according to one embodiment of the present disclosure.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252, sometimes referred to as a chassis interconnect elements or CIE, are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be a distributed Virtual Ethernet bridge (dVEB) configured to forward data frames throughout the distributed network switch 180. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, each server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

The bridge elements 120 are operatively connected to multiple bridge elements 120. In one embodiment, the bridge elements 120 are connected to each other using the switching layer 130 (e.g., via a mesh connection schema). As such, no matter the bridge element 120 used, a data packet can be routed to another bridge element 120 located on any other switch module. In some embodiments, this may be accomplished by directly connecting each bridge element 120, i.e., each bridge element 120 having a dedicated direct data path to every other bridge element 120. Alternatively, in some embodiments, the switching layer 130 may use a spine-leaf architecture wherein each bridge element 120 (i.e., a leaf node) is attached to at least one spine node. The spine nodes route data packets received from the bridge elements 120 to the correct spine node, which then forward the data packet to the correct bridge element 120. In one embodiment, the bridge elements 120 may forward data frames to other bridge elements 120 in the same sub-switch 254, in different sub-switches 254 of the same switch module (e.g., switch module 250), or even in different switch modules 250, 251, 252 via switching layer 130.

Each sub-switch 254 may maintain a forwarding database (FDB) 222 shared by bridge elements 120 of that sub-switch 254. The forwarding database 222 may include address data (e.g., MAC addresses) that is registered and maintained through communication and cooperation with the bridge elements 120, and in some cases, the servers 210, 212. In some embodiments, the forwarding databases 222 may be configured similarly to the forwarding database 150 shown in FIG. 1, where each sub-switch 254 is configured to maintain a synchronized copy of the forwarding database to give local bridge elements access to the entire forwarding database with low latency and rapid response times. In other embodiments, each bridge element 120 may maintain a localized cache of the forwarding database 222.

In some embodiments, IOMC 255 may be configured to request a dump operation that retrieves entries from a forwarding database 222 for analysis, system administrative, or other operational purposes. In some cases, the forwarding database may contain a very large number of entries (e.g., millions of entries), and processing such large FDBs may be inefficient. Under conventional techniques, firmware of a switch unit reads, analyzes, and retrieves each and every single entry of a forwarding database, which can be very inefficient and costly in time and computing resources.

Accordingly, embodiments of the present disclosure provide a switching module having a hardware function to read selected entries from a forwarding database and provide the selected entries to firmware. In one embodiment, firmware (e.g., executing as an IOMC) of the switching module may provide a match criteria to the sub-switch, which returns FDB entries matching that criteria to the IOMC. As such, analysis and selection of entries from the forwarding database may be performed in hardware, although it should be recognized that in some embodiments, one or more functions or sub-functions described herein may be arranged to also be performed by firmware (e.g., software).

Figure 3:
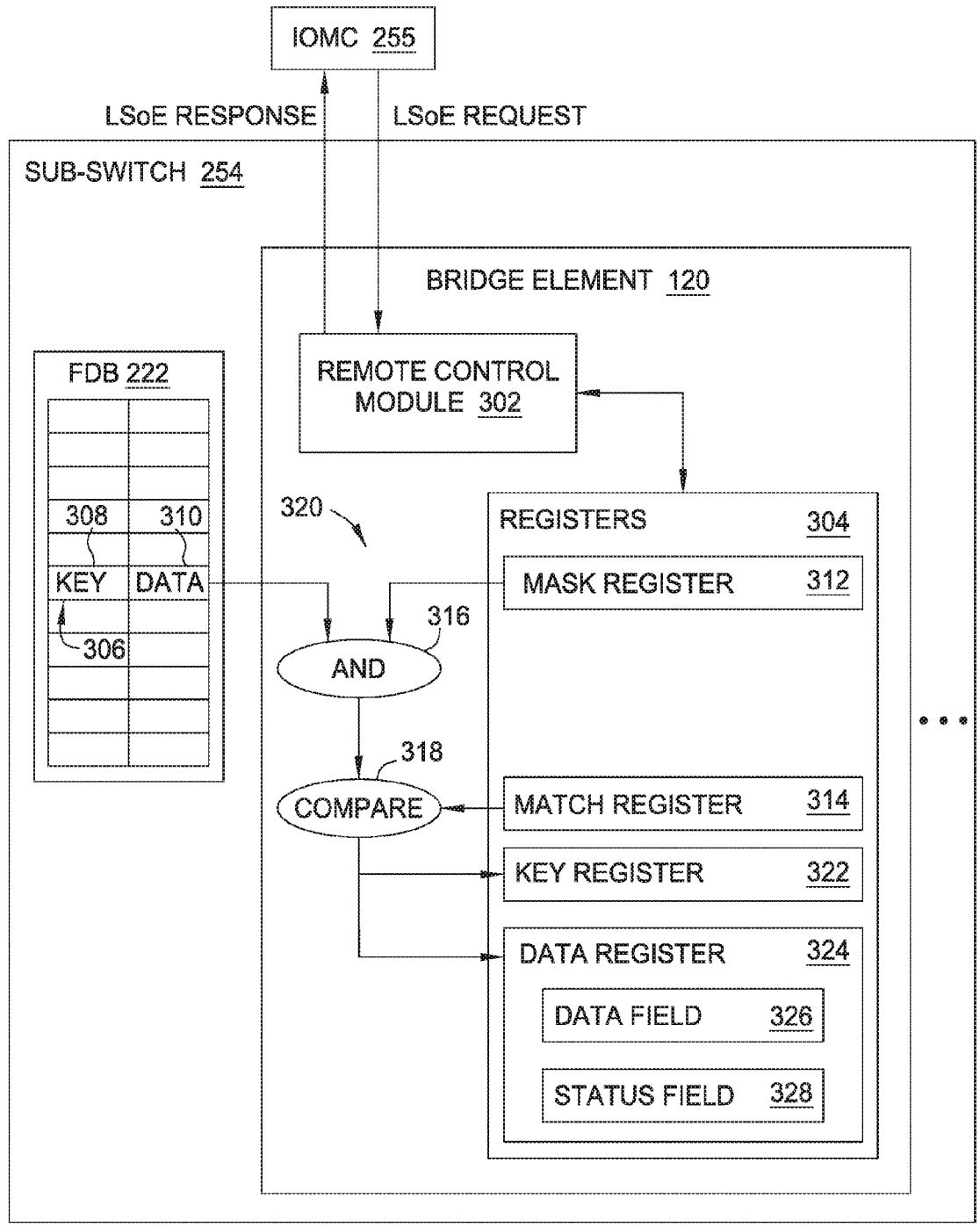
FIG. 3 is a block diagram depicting a sub-switch module in greater detail, according to one embodiment of the present disclosure.

FIG. 3 is a block diagram depicting a sub-switch 254 in greater detail, according to one embodiment of the present disclosure. As shown, the sub-switch 254 includes at least one bridge element 120 and a forwarding database 222 having a plurality of routing entries 306 (sometimes referred to as FDB entries). In one or more embodiments, the forwarding database 222 may be configured as one or more hash tables, where data 310 of a routing entry 306 is inserted into, updated, and retrieved from the forwarding database by using a hash function that generates a hash value based on a routing key 308 of the routing entry 306.

Routing entries 306 may associate a network address (e.g., destination MAC address) with a network interface (e.g., port) to which a data frame is to be forwarded. In one embodiment, each routing entry 306 identified by a routing key 308 may include data 310 comprising a plurality of fields. In one embodiment, the routing key 308 may include Layer 2 routing information, such as a virtual local area network (VLAN) tag (e.g., a 12-bit field), a logical network (LN) identifier (e.g., a 4-bit field), and a media access control (MAC) address (e.g., a 48-bit field). Data 310 may include a plurality of fields, including: a logical network field (e.g., a 4-bit field) that enables each routing entry 306 for a given network address (e.g., source, destination) to specify a logical network (LN) identifier associated with the given network address; an owner field (e.g., a 1-bit field) indicating whether the corresponding switch module is designated as the "owner" of the respective routing entry; a static field (e.g., a 1-bit field) indicating whether the routing entry 306 is set by software and may not be synchronized or shared with other switch modules and forwarding databases; an age field (e.g., 1-bit field) that specifies an extent to which the respective routing entry is considered to have aged or to be stale according to an aging policy; and a valid status field (e.g., 1-bit field) that specifies when a routing entry is no longer valid, for example, due to aging out of the forwarding database.

The sub-switch 254 may include a plurality of registers 304 for temporarily storing state data, instructions, and other data, such as routing entries 306, used during data routing operations. In one embodiment, the sub-switch 254 may include a mask register 312, a match register 314, a key register 322, and a data register 324. The sub-switch 254 may further include command registers (not shown) used to store operational instructions to be performed on the FDB 222, as described later.

While the registers 304 are depicted in FIG. 3 as part of the bridge element 120, it should be recognized that other embodiments may be used, such as an embodiment where the registers 304 are a register partition associated with a particular bridge element 120 and partitioned from a bank of registers shared among the bridge elements of a sub-switch 254 or among switch modules 250, 251, 252. In other embodiments, registers 304 including mask and match registers 312, 314 may be part of a register partition associated with the FDB 222. Furthermore, in some embodiments, the mask register 312 and match register 314 may be hardware circuitry available on a sub-switch 254 configured to perform a "flush" operation that removes particular entries from the FDB 222 and other data structures of the sub-switch 254 that match a particular criteria. In such embodiments, the sub-switch 254 is configured to extend the functionality of the mask and match registers, and accompanying circuitry, to perform dump operations according to techniques provided herein.

The mask and match registers 312, 314 may specify a mask/match criteria that can be used to retrieve, update, or manage particular entries in the FDB 222. The mask register 312 may be configured to store a value indicating which portion of a routing entry 306 should be compared to input criteria, as specified by a value stored in the match register 314. In some embodiments, the mask register 312 may store a value indicating particular fields of the routing entry 306 or particular portions of particular fields of the routing entry 306 to be compared to input criteria. In one particular implementation, the mask register 312 may store a bit mask value comprising 0's and 1's values, where a 1 value represents a portion of the routing entry 306 to be matched against. In some embodiments, the mask register 312 may comprise separate key mask and data mask registers, and the match register 314 may comprise separate key match and data match registers used to define separate match/mask criteria for the key and data registers 322, 324. In other embodiments, the mask register 312 and match register 314 may comprise single values used to compare against each routing entry 306, with the key and data portions amalgamated into a single value for comparison.

In one embodiment, the IOMC 255 may instruct the sub-switch 254 to perform an dump operation, sometimes referred to as "Read Entry with Mask/Match," on FDB 222 that returns routing entries 306 that match the mask/match criteria specified in the mask and match registers 312, 314. The sub-switch 254 is configured to walk through the FDB 222 and copy a routing entry 306 to the key and data registers 322, 324 when the routing entry matches the mask/match criteria specified in the mask and match registers 312, 314.

In the embodiment shown in FIG. 3, the sub-switch 254 includes circuitry 320 having an AND gate 316 and comparison logic 318 configured to apply the mask/match criteria. As shown, the data value of a routing entry 306 and the mask register 312 are applied to the inputs of the AND gate 316, causing the undesired portion of the routing entry to be masked out (i.e., zeroed out). The resulting portion of the routing entry 306 and the value of the match register 314 are then compared using the comparison logic 318. It should be recognized that other implementations of circuitry 320 may be used. In some embodiments, circuitry 320 may include additional AND gates and comparison logic (not shown) to enforce default criteria, e.g., that the routing entry be valid (i.e., the valid field bit is set).

If matched, the sub-switch 254 stores the matched routing entry 306 in one or more output registers, such as key and data registers 322 and 324 shown in FIG. 3. If the entry does not match the mask/match criteria, the sub-switch 254 may continue to read entries in the FDB 222 (and perform the mask/match operation) until a match is found, the end of the FDB 222 is reached, or a timeout occurs, which is discussed later.

According to one or more embodiments, the distributed network switch 180 uses a packet-based delivery mechanism to get data from one component to another, such as routing entries 306 from the sub-switch 254 to a requesting IOMC 255. In one embodiment, the IOMC 255 may be configured to manipulate registers 304 within any sub-switch 254 using a management packet transported through the distributed network switch 180. In some embodiments, the management packet, sometimes referred to as a Load Store over Ethernet (LSoE) frame, may be an Ethernet frame containing a list of commands (e.g., read or write operations on particular registers) and payload data. The LSoE frames may be used for general configuration as well as updates to forwarding databases 222 (FDB), logical network or VLAN tables, spanning tree group (STG) tables, multicast and broadcast (MCBC) tables, FCoE source and destination address tables (e.g., FSAT, FDAT), link aggregation tables (LAG), link state tables (LST), access control lists (ACL), metering control blocks (MTR), reading management information base (MIB) counters, and other operations.

In one embodiment, the bridge element 120 of the sub-switch 254 may include a remote control (RC) module 302. The remote control module 302 is configured to receive LSoE request frames (e.g., addressed to the bridge element 120), process the contents of the request frames, and generate and return a corresponding LSoE response frame based on the processing results. In some embodiments, the remote control module 302 parses commands found in the LSoE frame, issues read and/or write commands to the registers 304, overlays data onto the original request frame as the remote control module processes, and sends the resultant LSoE response frame back to the original requestor.

In one embodiment, an LSoE request packet may contain one or more data fields for write (i.e., "store") commands that, when executed, cause the sub-switch 254 to write a specified value to one of registers 304. The LSoE packet may contain one or more data fields for read (i.e., "load") commands that, when executed, cause the sub-switch 254 to read data from a specified register 304. In some embodiments, the data field for the load commands may reserve an empty payload portion within the LSoE request packet (or in other embodiments, rather than empty, contains a bogus payload having a nonzero predetermined data pattern). Data returned from executing load commands may then be overlaid within the payload portion of the LSoE packet. Together with other modifications to the LSoE packet, the packet may then be returned to the requestor as a response packet.

The packet-based delivery mechanism may utilize timers to limit how long a component has to finish executing read or write operations (and return an LSoE response frame). For example, the remote control module 302 may time how long it takes FDB 222 to read routing entries 306, for example, by asserting a "Read Done" or "Write Done" indication. In one embodiment, the remote control module 302 may utilize a maximum timeout value, sometimes referred to as a "pipeline timeout value", for any register operations to be completed, e.g., 64 k cycles, or approximately 144 μs. In many cases, the remote control module 302 find, load, and return a matching routing entry in an LSoE response frame before expiration of the pipeline timeout value. However, in some cases, the FDB 222 might not assert "Read/Write Done" until either a matching routing entry has been found, or the end of the FDB table has been reached. As such, if the FDB 222 had to read a large FDB table with many entries without finding a match (e.g., assuming 1 million routing entries taking 15 cycles per read would result in needing over 15 million cycles, or 35 ms, to walk the entire FDB), the read operation would timeout well before the end of the FDB is reached, causing an error or interrupt to be raised.

According to one embodiment, the FDB 222 is configured to maintain a separate timer having a different timeout value than the pipeline timeout value applied to all operations. In some embodiments, the separate timeout value associated with the FDB 222 may be set to a value less than the pipeline timeout value. By way of example, the pipeline timeout value may comprise a 24-bit counter for any register operations to be completed, while the timeout value associated with the FDB may be a 16-bit counter for register operations specific to the FDB to be completed. If the FDB 222 cannot find a matching routing entry 306 within the FDB timeout value, the FDB 222 still writes some value to the expected output registers, but provides a signal to the requesting IOMC 255 that the FDB has timed out and that causes the IOMC 255 to ignore or discard the returned results. In some embodiments, the FDB 222 may write filler values (e.g., zeroes) to the key and data registers 322, 324, write an indication that the values within key and data registers 322, 324 are generated due to FDB timeout, and assert "Read/Write Done." Accordingly, utilizing a separate timer specific to the FDB 222 enables a given LSoE frame to finish within a bounded amount of time, rather than be subject to timeouts when searching the FDBs with sparse routing entries 306 satisfying the mask/match criteria.

Figure 4:
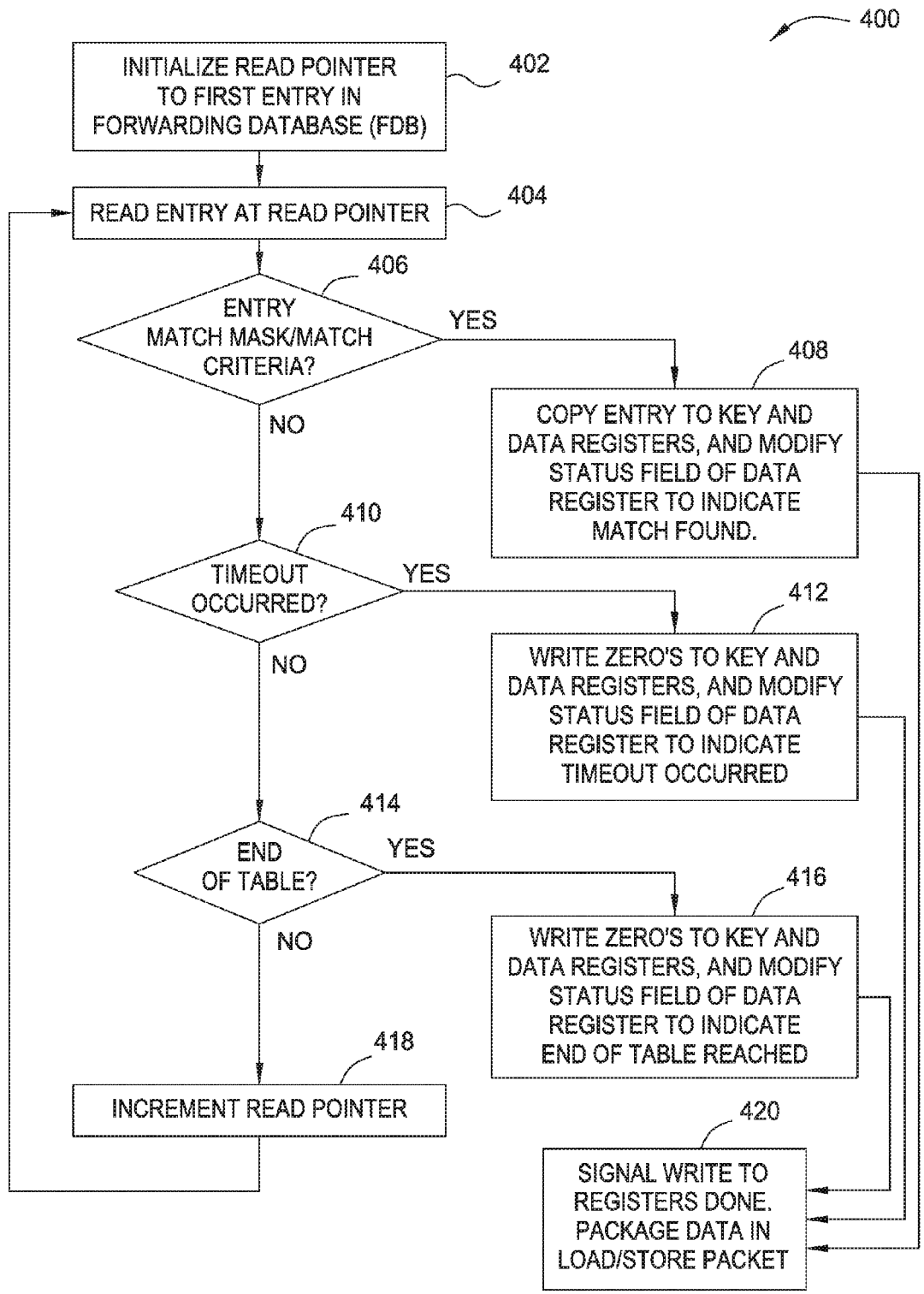
FIG. 4 is a flow diagram depicting a method for retrieving routing information from a forwarding database, according to one embodiment of the present disclosure.

FIG. 4 is a flow diagram depicting a method 400 for retrieving routing information from a forwarding database, according to one embodiment of the present disclosure. The method 400 shown in FIG. 4 may be initiated by the remote control module 302 receiving an LSoE packet (e.g., transmitted by an IOMC 255) requesting an operation that returns routing entries 306 from the FDB 222 of the sub-switch 254 that matches a specified criteria. In one embodiment, the LSoE packet may be a request frame containing a list of read and write commands that cause the sub-switch 254 to perform a dump operation. The remote control module 302 processes the received LSoE packet by extracting and executing (e.g., by operation of the sub-switch 254) each of the commands contained within the packet.

In one implementation, the LSoE packet may contain a data field for write (i.e., "store") commands that, when executed, cause the sub-switch 254 to write a first value to mask register 312, and write a second value to match register 314, where the first and second values specify the mask/match criteria to be used. The LSoE packet may also contain a data field for a write command that causes the sub-switch 254 to write an operational instruction to a control register of the registers 304. The operational instruction may include an operation code associated with the dump operation (e.g., "Read Entry with Mask/Match") and operational parameters, such as an entry index of FDB on which to start for the dump operation of FDB (e.g., index=0), and whether to enable auto-increment functionality when reading values from registers 304, described later. The LSoE packet may further contain one or more data fields for read (i.e., "load") commands that, when executed, cause the sub-switch 254 to read data from the key and data registers 322 and 324 and load that data in an LSoE response for return. In some embodiments, to perform multiple loads, rather than enumerating each load command, the load command may be a sequential load command that causes the load operation to be performed a specified number of times, e.g., repeatedly loading matched routing entries from key and data registers 322, 324 into the LSoE response.

To perform the dump operation, the sub-switch 254 attempts to find a first routing entry 306 in the FDB that matches the mask/match criteria. The method 400 begins at step 402 where the sub-switch 254 initializes a read pointer to a first entry in the FDB 222. In some embodiments, the read pointer may be initialized to other entries as specified by the operational instruction (e.g., index=10). In some embodiments, the read pointer may be set based on the routing entry last read by the FDB 222, in order to resume a previously initiated dump operation. At step 404, the sub-switch 254 reads the routing entry referenced by the read pointer.

At step 406, the sub-switch 254 determines whether the routing entry matches the mask/match criteria. In one implementation, the sub-switch 254 determines a portion of routing entry to be compared based on the mask value in the mask register 312 (e.g., via AND gate 316), and compares the determined portion to the value of the match register 314. For example, the mask value may be bitmask specifying a portion of the routing entry corresponding to the MAC address field, and the match value may be a particular MAC address value (e.g., "01-23-45-67-89-ab") or a portion of a MAC address (e.g., "01-23-45-66" prefix). In some embodiments, the mask value may select any portion of the routing entry, including any field in the key 308 or data 310, such as the VLAN tag, LN identifier, MAC address, the owner field, the static field, the age field, or the valid status field, as defined above.

If the routing entry matches the mask/match criteria, at step 408, the sub-switch 254 copies the routing entry to output registers, and modifies the status field 328 of the data register 324 to indicate a match has been found. In one embodiment, the sub-switch 254 copies the key 308 of the matched routing entry to the key register 322 and the data 310 of the matched routing entry to the data register 324 (e.g., the data field 326). In some embodiments, the sub-switch 254 may set the value of the status field 328 of the data register 324 to indicate a match has been found, e.g., by setting a "match field" flag to TRUE.

The sub-switch 254 then proceeds to step 420, where the sub-switch signals that a write to the registers 304 is done, for example, by asserting "Read/Write Done." The remote control module 302 generates an LSoE response frame having the data found in the key and data registers 322 and 324, i.e., the found routing entry. In some embodiments, the remote control module 302 overlays the data in the key and data registers 322, 324 into a payload portion of the original LSoE request frame, turning the request frame into a response frame. The remote control module 302 transmits the LSoE response frame to the component requesting the dump operation, for example, the IOMC 255.

If the routing entry does not match the mask/match criteria, at step 410, the sub-switch 254 checks whether a timeout has occurred based on the FDB timeout value. If so, at step 412, the sub-switch 254 writes dummy values (e.g., 0's or other pre-determined reserved values) to the key and data registers 322 and 324, and modifies the status field 328 of the data register 324 to indicate that a timeout associated with the FDB has occurred. The sub-switch then proceeds to step 420, where the sub-switch signals that a write to the registers 304 is done (i.e., asserting "Read/Write Done"). The remote control module 302 generates a LSoE response frame having the data found in the key and data registers 322 and 324, i.e., the dummy values and the status field indicating a timeout has occurred. As described above, the remote control module 302 may overlays the values in the key and data registers 322, 324 (i.e., the dummy values) into a payload portion of the original LSoE request frame, turning the request frame into a response frame. Even though the LSoE response frame may not contain a routing entry matching the mask/match criteria, the remote control module 302 is able to return an LSoE response frame to IOMC 255 before the expiration of the pipeline timeout value, and avoid raising timeout errors. Furthermore, the IOMC 255 is configured to receive and process the LSoE response frame, and discard the dummy values contained in the LSoE response frame based on the status field indicating the response frame was returned due to a FDB timeout occurring.

At step 414, the sub-switch 254 determines whether the read pointer has reached the end of the FDB table (and the last entry did not match the criteria). If so, at step 416, the sub-switch writes null values to key and data registers 322 and 324, and modifies the status field 328 to indicate that the end of the table has been reached. In some embodiments, the null values written to the key and data registers may be 0's or other pre-determined reserved values, which may be the same or different values used in the FDB timeout scenario at step 412. The sub-switch proceeds to step 420, similar to the steps described above, and asserts "Read/Write Done." The remote control module 302 generates and transmits an LSoE response frame having the values in the key and data registers 322 and 324, i.e., the null values and the status field indicating the end of the table has been reached, to the requesting IOMC 255. The IOMC 255 may be configured to receive and process the LSoE response frame, discard the null values, and determine that the dump operation has concluded based on the status field indicating the end of the FDB has been reached.

In some embodiments, the sub-switch 254 may be configured to determine to whether the read pointer has reached the end of the FDB table and the last entry does indeed match the criteria. In this special case, the sub-switch copies the routing entry (including key and data portions) to output registers (e.g., key and data registers 322, 324) and modifies the status field 328 of the data register 324 to indicate both i) a match has been found and ii) the end of the table has been reached. The sub-switch 254 may then proceed to step 420 to assert Read/Write Done, and generate a LSoE frame, as described above.

Responsive to determining the read pointer has not reached the end of the table, at step 418, the sub-switch 254 increments the read pointer, and returns to step 404, to continue reading entries in the FDB 222 until a matching routing entry is found (i.e., at step 408), a timeout occurs (i.e., at step 412), or the end of the FDB is reached (i.e., at step 416).

According to one embodiment, the read operations of the FDB 222 may be configured with auto-increment functionality where additional read operations are automatically triggered upon reading of registers 304. When a read command is issued to extract data from a register containing the data returned from the FDB from a prior operation (e.g., key and/or data registers 322 and 324), that register triggers the next operation to the FDB. For example, a first read operation performed according to the method 400 is initiated by writing a command register in the registers 304 with a "Read Entry with Mask/Match" operation code. Additional read operations according to the method 400 may be initiated when the key or data register 322 and 324 is read (e.g., by the remote control module 302). In these additional read operations, the FDB 222 attempts to find the first FDB entry that matches the mask/match criteria, starting with the next location after the entry last matching the criteria, or that caused a FDB timeout. Accordingly, embodiments provide an asynchronous dump operation where an initial Read Entry with Mask/Match command initiates the process described herein, which continues to run responsive to subsequent read commands that continue to feed the dump operation and read the operation results stored in the registers 304.

Figure 5A:
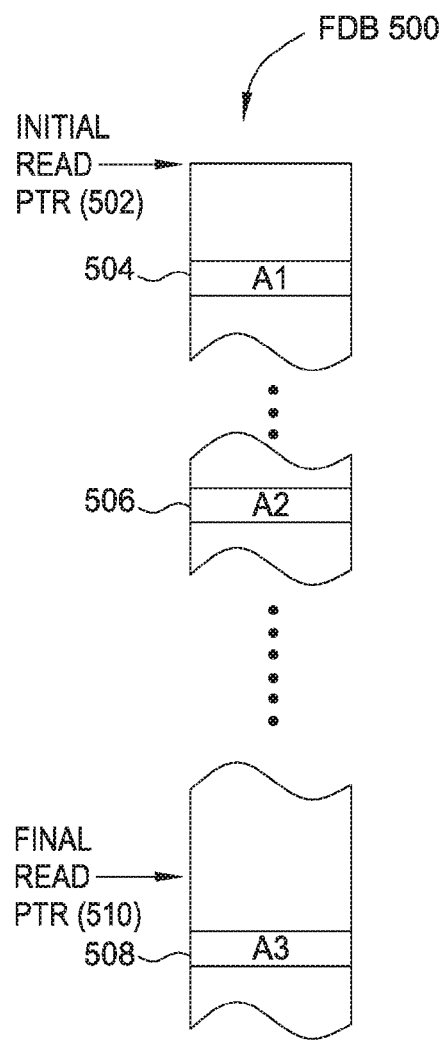
FIG. 5A is a block diagram depicting an exemplary forwarding database having sparsely distributed routing entries that match a requested mask/match criteria, according to one embodiment of the present disclosure.

FIG. 5A is a block diagram depicting an exemplary FDB 500 having a plurality of routing entries that match a requested mask/match criteria, but are sparsely distributed in the FDB 500. In other words, the matching routing entries 504, 506, 508 having values "A1", "A2", and "A3" respectively, are spread out throughout the FDB table such that the FDB timeout would occur when walking between matching routing entries (e.g., from 504 to 506). It should be recognized that the FDB 500 contains other routing entries that may not match the mask/match criteria and are located between the matching routing entries, but are omitted from FIG. 5A for clarity of illustration. In this example, an LSoE request frame may request a read entry with the mask/match criteria for the value "A," starting at initial read pointer 502 at the beginning of the FDB 500, and with a sequence count of 5 (i.e., indicating 5 read operations).

In response to the first read operation, the first returned results (i.e., in an LSoE response frame) includes a payload for the routing entry 504 having the value "A1," where a status field 328 copied from the data register 324 indicates a match has been found. In response to a second read operation, the second returned results may contain a payload having dummy or null values (i.e., 0's) and a status field 328 copied from the data register 324 indicating the FDB timeout has occurred. In response to a third read operation, the third returned results includes a payload for the routing entry 506 having the value "A2," where the status field copied from the data register indicates a match has been found. In response to a fourth read operation, the fourth returned results may include a payload containing dummy or null values and a status field indicating that the FDB timeout has occurred. In response to a fifth read operation, the fifth returned results may include a payload containing dummy or null values and a status field indicating a FDB timeout has occurred. As such, in the example shown in FIG. 5A, the fifth read operation has timed out and the final read pointer 510 ends up pointing to an entry before the final matching routing entry 508.

Figure 5B:
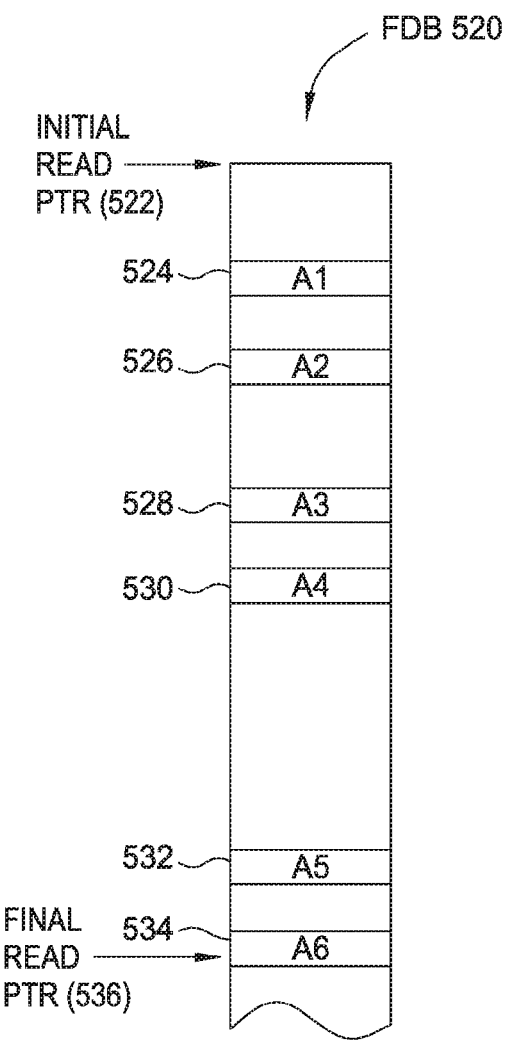
FIG. 5B is a block diagram depicting an exemplary forwarding database depicting densely distributed routing entries that match a requested mask/match criteria, according to one embodiment of the present disclosure.

FIG. 5B is a block diagram depicting an exemplary FDB 520 depicting a plurality of routing entries that match a requested mask/match criteria, and are densely populated in the FDB 500. In other words, the matching routing entries 524, 526, 528, 530, 532, and 534 having values "A1", "A2", "A3", "A4", "A5", "A6", respectively, are located within the FDB table such that matching routing entries might be found in consecutive read operations without the FDB timeout occurring. As with FIG. 5A, it should be recognized that the FDB 520 contains other routing entries that may not match the mask/match criteria and are located between the matching routing entries, but are omitted from FIG. 5B for clarity of illustration. As in the example from FIG. 5A, an LSoE request frame may request a read entry with the mask/match criteria for the value "A," starting at initial read pointer 522 at the beginning of the FDB 520, and with a sequence count of 5 (i.e., indicating 5 read operations).

In response to the first read operation, the first returned result in an LSoE response frame includes a payload for the routing entry 524 having the value "A1" (i.e., copied from the key and data registers 322, 324) and a status value (e.g., copied from status field 328) indicating a match has been found. In response to a second read operation, the second returned value (e.g., in the same or subsequent LSoE response frame) includes a payload for the routing entry 526 having the value "A2" and a status value indicating a match has been found. Similarly, in response to third, fourth, and fifth read operations, the third, fourth, and fifth returned values include payloads for the routing entries 528, 530, 532, respectively, and a status value indicating a match in the FDB has been found. As such, in the example shown in FIG. 5B, the fifth read operation ends with the final read pointer 536 pointing to a routing entry after the routing entry 532 (i.e., routing entry 534). According to some embodiments, the IOMC 255 may continue to transmit read operations to the FDB 222 until the end of FDB 520 is reached and an end-of-FDB indication is received.

Accordingly, embodiments described herein provide a mechanism for selectively reading routing entries from the forwarding database using hardware, rather than software, to process matching criteria. Embodiments of the present disclosure advantageously reduce the amount of LSoE overhead which may compete with ordinary traffic for the same network resources.

While the foregoing is directed to embodiments of the present disclosure, other and further embodiments of the present disclosure may be devised without departing from the basic scope thereof, and the scope thereof is determined by the claims that follow.

What is claimed is:

1. A method for retrieving routing entries from a switch module, the method comprising:
   receiving, from a management controller, a request for at least one routing entry in a forwarding database (FDB) matching specified criteria, wherein the request is associated with a first timeout value;
   initiating a timer associated with the FDB having a value less than the first timeout value;
   responsive to determining a first routing entry in the FDB matches the specified criteria before expiration of the timer associated with the FDB, writing the first routing entry to an output register; and
   generating a response frame, to the management controller, containing the value of the output register.

2. The method of claim 1, wherein the specified criteria comprises a match value and a mask value, wherein the mask value specifies a portion of the first routing entry to compare to the match value.

3. The method of claim 1, wherein determining the first routing entry in the FDB matches the specified criteria before expiration of the timer associated with the FDB further comprises:
   modifying the first routing entry based on a value in a mask register to select a portion of the first routing entry; and
   determining the selected portion of the first routing entry matches a value in a match register.

4. The method of claim 1, wherein generating the response frame, to the management controller, containing the value of the output register further comprises:
   generating the response frame comprising the first routing entry and a status indication that a match has been found.

5. The method of claim 1, wherein generating the response frame, to the management controller, containing the value of the output register further comprises:

generating the response frame comprising a payload containing dummy values and an indication that an FDB timeout has occurred, wherein the response frame is configured to cause the management controller to discard the dummy values.

6. The method of claim 1, further comprising:
responsive to determining an end of the FDB has been reached and a last routing entry in the FDB does not match the specified criteria, writing an indication that the end of the FDB has been reached to the output register,
wherein the response frame is generated to comprise a payload containing dummy values and the indication that the end of the FDB has been reached, and
wherein the response frame is configured to cause the management controller to discard the dummy values.

7. The method of claim 1, further comprising:
receiving, from the management controller, a read operation associated with the output register; and
executing the read operation associated with the output register, wherein execution of the read operation triggers finding of a next routing entry in the FDB that matches the specified criteria and writing the next routing entry to the output register.

8. The method of claim 1, wherein the first timeout value comprises a 24-bit counter, and the timer associated with the FDB comprises a 16-bit counter.

9. A method for retrieving routing entries from a switch module, the method comprising:
receiving, from a management controller, a request for at least one routing entry in a forwarding database (FDB) matching specified criteria, wherein the request is associated with a first timeout value;
initiating a timer associated with the FDB having a value less than the first timeout value;
responsive to expiration of the timer associated with the FDB without finding a match of a routing entry in the FDB with the specified criteria, writing an indication that an FDB timeout has occurred to the output register; and
generating a response frame, to the management controller, containing the value of the output register.

10. The method of claim 9, wherein the specified criteria comprises a match value and a mask value, wherein the mask value specifies a portion of the first routing entry to compare to the match value.

11. The method of claim 9, wherein determining the first routing entry in the FDB matches the specified criteria before expiration of the timer associated with the FDB further comprises:
modifying the first routing entry based on a value in a mask register to select a portion of the first routing entry; and
determining the selected portion of the first routing entry matches a value in a match register.

12. The method of claim 9, wherein generating the response frame, to the management controller, containing the value of the output register further comprises:
generating the response frame comprising the first routing entry and a status indication that a match has been found.

13. The method of claim 9, wherein generating the response frame, to the management controller, containing the value of the output register further comprises:
generating the response frame comprising a payload containing dummy values and an indication that an FDB timeout has occurred, wherein the response frame is configured to cause the management controller to discard the dummy values.

14. The method of claim 9, further comprising:
responsive to determining an end of the FDB has been reached and a last routing entry in the FDB does not match the specified criteria, writing an indication that the end of the FDB has been reached to the output register,
wherein the response frame is generated to comprise a payload containing dummy values and the indication that the end of the FDB has been reached, and
wherein the response frame is configured to cause the management controller to discard the dummy values.

15. The method of claim 9, further comprising:
receiving, from the management controller, a read operation associated with the output register; and
executing the read operation associated with the output register, wherein execution of the read operation triggers finding of a next routing entry in the FDB that matches the specified criteria and writing the next routing entry to the output register.

16. The method of claim 9, wherein the first timeout value comprises a 24-bit counter, and the timer associated with the FDB comprises a 16-bit counter.

* * * * *